(12) United States Patent
Rekaya-Ben Othman et al.

(10) Patent No.: US 10,735,224 B2
(45) Date of Patent: Aug. 4, 2020

(54) TREE SEARCH-BASED DECODING

(71) Applicant: INSTITUT MINES TELECOM, Paris (FR)

(72) Inventors: Ghaya Rekaya-Ben Othman, Antony (FR); Asma Mejri, Antibes (FR)

(73) Assignee: INSTITUT MINES TELECOM, Paris (FR)

( * ) Notice: Subject to any disclaimer, the term of this patent is extended or adjusted under 35 U.S.C. 154(b) by 112 days.

(21) Appl. No.: 15/550,922

(22) PCT Filed: Feb. 15, 2016

(86) PCT No.: PCT/EP2016/053091
§ 371 (c)(1),
(2) Date: Aug. 14, 2017

(87) PCT Pub. No.: WO2016/131738
PCT Pub. Date: Aug. 25, 2016

(65) Prior Publication Data
US 2018/0241591 A1 Aug. 23, 2018

(30) Foreign Application Priority Data
Feb. 19, 2015 (EP) .................................... 15305255

(51) Int. Cl.
*H04B 7/06* (2006.01)
*H04L 25/03* (2006.01)
(Continued)

(52) U.S. Cl.
CPC ..... *H04L 25/03242* (2013.01); *H04B 7/0697* (2013.01); *H04L 1/0054* (2013.01); *H04L 1/0618* (2013.01)

(58) Field of Classification Search
CPC .......... G06F 17/16; G06F 17/30; H03M 7/30; H03M 13/00; H03M 7/03; H04B 1/10;
(Continued)

(56) References Cited

U.S. PATENT DOCUMENTS

2005/0175122 A1* 8/2005 Nefedov .............. H04B 1/7105
375/323
2008/0313252 A1 12/2008 Kim et al.
(Continued)

FOREIGN PATENT DOCUMENTS

EP 2274852 1/2011
EP 3001625 3/2016
WO 2009135850 A2 11/2009

OTHER PUBLICATIONS

O. Damen, A. Chkeif, and J-C. Belfiore "Lattice code decoder for space-time codes", IEEE Communications Letters, vol. 4, No. 5, pp. 161-163, May 2000.
(Continued)

*Primary Examiner* — Shawkat M Ali
(74) *Attorney, Agent, or Firm* — Meagher Emanuel Laks Goldberg & Liao, LLP

(57) ABSTRACT

A method, device, and a computer program are provided to decode a signal received through a transmission channel in a communication system, the received signal being represented by a signal vector. The method comprises:
calculating an initial estimate of a transmitted symbol vector carried by the received signal vector;
calculating a bound parameter (201) from a linear function of the initial estimate of the transmitted symbol vector, the linear function being defined by a slope coefficient and an intercept coefficient, the method further comprising:
determining estimated symbols representative of the transmitted symbols carried by the received signal, the
(Continued)

estimated symbols being determined from a set of candidate lattice points, each lattice point comprising a set of components, each component of a candidate lattice point being searched in a search interval (203), the search interval having at least one search interval bound computed from the bound parameter;

determining (205) the estimated symbols from the closest lattice point to the received signal vector among the candidate lattice points.

18 Claims, 8 Drawing Sheets

(51) Int. Cl.
 *H04L 1/00* (2006.01)
 *H04L 1/06* (2006.01)

(58) Field of Classification Search
 CPC .......... H04B 7/06; H04B 7/10; H04B 1/0697;
  H04L 1/00; H04L 1/02; H04L 5/12;
  H04L 25/03; H04L 27/06; H04L 27/22;
  H04L 27/26; H04L 27/28; H04L 1/0054;
  H04L 1/0618; H04L 25/03242
 USPC ........ 370/208, 210; 375/219, 260, 267, 316,
  375/323, 340, 341, 346, 347; 708/212,
  708/441, 607; 714/794, 795
 See application file for complete search history.

(56) References Cited

U.S. PATENT DOCUMENTS

| | | | |
|---|---|---|---|
| 2009/0154599 A1* | 6/2009 | Siti ................ | H04L 1/0052 375/320 |
| 2009/0232241 A1* | 9/2009 | Shabany ............ | H04B 7/0413 375/262 |
| 2010/0034320 A1* | 2/2010 | Champion .......... | H04L 1/0631 375/340 |
| 2010/0246732 A1 | 9/2010 | Seo et al. | |
| 2010/0329395 A1* | 12/2010 | Kang .................. | H04L 1/0052 375/341 |

OTHER PUBLICATIONS

K. R. Kumar, G. Caire, and A. L. Moustakas, "The Diversity-Multiplexing Tradeoff of Linear MIMO Receivers", IEEE Information Theory Workshop ITW'07, pp. 487-492, 2007.

Bo Cheng et al: "A New Method for Initial Radius Selection of Sphere Decoding", Computers and Communications, 2007. ISCC 2007. IEEE Symposium on, IEEE, PI, Jul. 1, 2007 (Jul. 1, 2007), pp. 19-24.

Hee Goo Han et al: "Computational complexities of sphere decoding according to initial radius selection schemes and an efficient initial radius reduction scheme", Global Telecommunications Conference, 2005. Globecom '05. IEEE St. Loius, MO, USA Nov. 28-Dec. 2, 2005, Piscataway, NJ, USA, IEEE, vol. 4, Nov. 28, 2005 (Nov. 28, 2005), pp. 2354-2358.

International Search Report for PCT/EP2016/053091, dated Mar. 22, 2016.

International Written Opinion for PCT/EP2016/053091, dated Mar. 22, 2016.

E. Viterbo and J. Boutros "A universal lattice code decoder for fading channels", IEEE Trans. Inform. Theory, vol. 45, pp. 1639-1642, Jul. 1999.

Ghaya Rekaya Ben-Othman et al: "The Spherical Bound Stack Decoder", Networking and Communications, 2008. WIMOB '08. IEEE International Conference on Wireless and Mobile Computing, IEEE, Piscataway, NJ, USA, Oct. 12, 2008 (Oct. 12, 2008), pp. 322-327.

E. Viterbo and E. Biglieri "A universal decoding algorithm for lattice codes", In Quatorzieme colloque GRETSI, 1993.

W. Zhao and G.B. Giannakis "Sphere decoding algorithms with improved radius search", Proceedings of IEEE Transactions by on Communications, 53(7)1104-1109, Jul. 2005.

B. Hassibi and H. Vikalo "On the expected complexity of sphere decoding", In Proceedings of Asilomar Conference on Signals, Systems and Computers, vol. 2, pp. 1051-1055, Nov. 2001.

J. Jalden, P. Elia, "DMT optimality of LR-aided linear decoders for a general class of channels, lattice designs, and system models", IEEE Transactions on Information Theory, vol. 56, No. 10, Oct. 2010.

J.-C. Belfiore, G. Rekaya, E. Viterbo "The Golden Code: A 2×2 Full-Rate Space-Time Code with Non-Vanishing Determinants", IEEE Transactions on Information Theory, vol. 51, No. 4, pp. 1432-1436, Apr. 2005.

W. Abediseid and Mohamed Oussama Damen, "Lattice Sequential Decoder for Coded MIMO Channel: Performance and Complexity Analysis", CoRR abs/1101.0339 (2011).

* cited by examiner

TREE SEARCH-BASED DECODING

TECHNICAL FIELD

The invention generally relates to digital communication systems, and in particular to methods, device, and computer program products for decoding a received data signal in a digital communication system.

BACKGROUND

Last years have witnessed spectacular developments of wireless networks that have widely transformed all aspects of modern societies. Driven by the emergence of new real-time high-throughput multimedia applications and the success of digital technologies, several network solutions are available today and are thoroughly used in all modes of communications. Main examples include cellular networks, wireless ad-hoc networks and wireless sensor networks involving single or multiple users and/or antennas. In order to ensure a reliable Quality of Service (QoS) in such communication systems, efficient physical layer technologies are needed. Particularly, in order to provide high-rate and reliable transmission, robust and low-complexity decoding algorithms need to be implemented at the receiver devices.

Optimal decoding performance are obtained using the Maximum Likelihood (ML) decoding technique according to which the receiver device is configured to estimate the likeliest candidate signal, given the observed received signal. Optimal ML decoding technique relies on counting all the possible transmitted signals (also referred to as "candidate signals"), and selecting the likeliest signal according to selection criteria, such as the minimization of the Euclidean distance between the received signal and the candidate signals.

Such ML decoding techniques use an exhaustive search and provide optimal performance. However, they require a high complexity that increases as the size of the constellation codebook or the number of the transmit antennas becomes higher, thereby making the implementation of such techniques impossible in practical systems.

In order to reduce the decoding complexity of ML decoding, tree-search based decoders have been proposed which explore a tree-structured search space to determine the closest vector to the received signal vector, such as the lattice spherical decoders (also known as "Sphere Decoders"). Sphere decoders implement a tree search to search lattice points within a sphere defined by a radius and centered at the received signal.

Sphere decoders were initially disclosed in the articles:

"A universal lattice code decoder for fading channels", IEEE Trans. Inform. Theory, vol. 45, pp. 1639-1642, July, 1999 by E. Viterbo and J. Boutros, and "Lattice code decoder for space-time codes", *IEEE Communications Letters*, 4(5):161-163, May 2000 by O. Damen, A. Chkeif, and J-C. Belfiore.

According to such sphere decoding methods, the ML solution is sought inside a sphere of a predefined radius centered at the received point. The sphere decoding method explores the tree of all possible lattice points and uses a path metric in order to discard paths corresponding to points outside the search sphere. In certain conventional sphere decoding methods, the initial radius of the search sphere is chosen from the noise variance. Limiting the search space to the spherical region allows a reduction of the number of visited points. These types of decoders are particularly adapted to wireless communications involving both single and multiple antennas as well as to optical communications. However, the complexity of these types of decoder increases with increasing constellation size or increasing number of antennas.

Alternative decoding techniques have been proposed such as sequential decoding techniques (also known as "stack" decoding techniques) which are based on a tree representation of the ML optimization problem (decoding tree) and on a tree search according to a Best-First strategy. Such sequential decoding techniques further use a stack to store the best candidate lattice points. In the decoding tree, each path from the root node to a leaf node is a possible transmitted signal. Nodes in the search tree correspond to different values taken by the decoded symbols and each path from the root node to a leaf node represents a possible transmitted signal.

Sequential decoding techniques take into account a cost (or metric) associated with the nodes of the decoding tree in order to determine a single candidate path inside a decoding tree by assigning a cost to each current node, such as the Euclidean distance between the signal received and the symbols vector represented by the path between the root node and the current node. The search tree is no longer binary and contains the different possible values of the information symbols.

Stack decoders improve the overall decoding complexity. However, for an increasing constellation size and a high number of antennas, the stack decoding technique requires a high computational complexity. In order to reduce this complexity, still another decoding technique referred to as the Spherical-Bound Stack decoder (SB-Stack) has been proposed in the article by G. R. Ben-Othman, R. Ouertani, and A. Salah, entitled "The Spherical Bound Stack Decoder", In Proceedings of International Conference on Wireless and Mobile Computing, pages 322-327, October 2008. The SB-stack approach combines the Stack search strategy with the Sphere Decoder search region: the decoder searches for the closest point inside a sphere centered at the received point implementing the stack decoding strategy. The spherical search region imposes a search interval for each decoded symbol. Only nodes belonging to these intervals at each tree level are visited and expanded. Limiting the search space to a spherical region allows the SB-Stack decoder to offer ML performance with a complexity reduction of at least 30% over the Sphere Decoder. However, although the SB-stack decoder offers lower complexity than the Sphere Decoder, its implementation in practical systems requires high storage capacities.

In conventional decoders implementing a tree search of the closest vector in a sphere space, such as sphere decoders or SB-Stack decoders, the computational complexity depends critically on the choice of the initial sphere radius. Accordingly, a main issue of such decoders is the selection of the sphere radius initially set to initiate the search of candidate lattice points. Specifically, to include at least one lattice point inside the sphere, the initial radius is required to be large enough. In contrast, a smaller initial radius shall be preferred to avoid an exponential search as a too large radius fosters the presence of many lattice points inside the sphere. Accordingly, a relevant trade-off shall be found between a large-enough initial radius for ensuring that at least one lattice point is included inside the sphere and a small-enough radius to optimize the computational complexity and greatly speed up the decoder.

Several methods have been proposed to select the initial radius. In one approach, the covering radius of the lattice generated by the channel matrix is considered as the initial radius. In still another approach, an upper bound of the covering radius is used as further disclosed in the article "A universal decoding algorithm for lattice codes", In *Quatorzieme colloque GRETSI,* 1993, by E. Viterbo and E. Biglieri. However, such selection methods based on the cover radius or the upper bound suffer from high computational complexity as an increasing number of lattice points are visited.

In yet another approach, the initial sphere radius can be selected taking into account the statistical characteristics of the noise power as disclosed in "Sphere decoding algorithms with improved radius search", *Proceedings of IEEE Transactions by on Communications,* 53(7):1104-1109, July 2005 BY W. Zhao and G. B. Giannakis. One major drawback of this method for initial radius selection is that it generates an increase of the initial radius. Indeed, when the initial radius is too small to succeed in searching at least one lattice point inside a sphere having the initial radius, the radius is increased until at least one lattice point is found inside the sphere.

Further, with such approaches, the number of lattice points included inside the sphere increases as the radius increases so that too many lattice points can be included inside the sphere, which greatly increases the decoder complexity.

Yet another solution for selecting the initial radius is based on considering the Euclidean distance between the received signal and the Zero Forcing estimate (also called the Babai estimate), as described in US2008/0313252 or in the article "On the expected complexity of sphere decoding", In Proceedings of Asilomar Conference on Signals, Systems and Computers, volume 2, pages 1051-1055, November 2001 by B. Hassibi and H. Vikalo. This ensures that the ZF estimate and at least one lattice point are included inside the sphere. However, this solution suffers from high computational complexity.

However, although the selection of the initial radius with such methods ensures that a plurality of lattice points are included within a sphere having the initial radius, the initial radius may be still too large thereby increasing the computational complexity of the decoder.

SUMMARY

In order to address these and other problems, there is provided a method for decoding a signal received through a transmission channel in a communication system, the received signal being represented by a signal vector, the method comprising:

calculating an initial estimate of a transmitted symbol vector carried by the received signal vector;

calculating a bound parameter from a linear function of the initial estimate of the transmitted symbol vector, the linear function being defined by a slope coefficient and an intercept coefficient, the method further comprising:

determining estimated symbols representative of the transmitted symbols carried by the received signal, the estimated symbols being determined from a set of candidate lattice points, each lattice point comprising a set of components, each component of a candidate lattice point being searched in a search interval, the search interval having at least one search interval bound computed from the bound parameter;

determining the estimated symbols from the closest lattice point to the received signal vector among the candidate lattice points.

In one embodiment, at least one of the slope coefficient and the intercept coefficient depends on a first function parameter which is higher than a predefined threshold, the threshold being determined from the initial estimate of the transmitted symbol vector.

The transmission channel may be associated with a channel matrix (H) of a given dimension (n) and a QR decomposition being previously applied to the channel matrix where Q designates an orthogonal matrix and R an upper triangular matrix.

In one embodiment, the bound parameter ($C_{prop}$) may be defined as the minimum value between:

A first quantity determined from at least one of a first radius ($C_1$) function of the noise variance ($\sigma^2$) and a second radius ($C_2$) function of the minimum of the diagonal elements of the Gram matrix of the channel matrix, and a second quantity corresponding to the value of the linear function ($C_{d_{DFE}}$).

In particular, the first quantity may be determined as the minimum between the first radius ($C_1$) and the second radius ($C_2$).

In one embodiment, the linear function may be a multiplicative function, the intercept coefficient being equal to zero.

Further, the first function parameter (a) is a real-valued positive parameter and the slope coefficient is equal to the inverse of the square root of the first function parameter $$\left(\frac{1}{\sqrt{\alpha}}\right).$$

The minimum threshold may then depend on the square of the initial estimate of the transmitted symbol vector ($d_{DFE}^2$), the square of the first radius ($C_1^2$), and/or the square of the second radius ($C_2^2$).

In particular, the minimum threshold $\alpha_{min}$ of the first function parameter ($\alpha$) may be defined as:

$$\alpha_{min} = \max\left(\frac{d_{DFE}^2}{C_1^2}, d_{DFE}^2 \times C_2^2\right),$$

where $d_{DFE}^2$ designates the square of the initial estimate of the transmitted symbol vector, $C_1^2$ designates the squared first radius ($C_1^2$), and $C_2^2$ the squared second radius.

In another embodiment, the linear function may be an additive function, the slope coefficient being equal to one.

Additionally, the first function parameter ($\alpha$) may be a real-valued positive parameter and the intercept coefficient is equal to $-\alpha$.

The minimum threshold may then depend on at least one of:

the difference between the initial estimate of the transmitted symbol vector ($d_{DFE}$) and the first radius ($C_1$) and/or the difference between the initial estimate of the transmitted symbol vector ($d_{DFE}$) and the second radius ($C_2$).

The minimum threshold $\alpha_{min}$ of the first function parameter ($\alpha$) may then be defined as the maximum value between:

the difference between the initial estimate of the transmitted symbol vector ($d_{DFE}$) and the first radius ($C_1$) and the difference between the initial estimate of the transmitted symbol vector ($d_{DFE}$) and the second radius ($C_2$).

In one embodiment, the candidate lattice points may be determined according to a sphere-constrained decoding algorithm using a decoding tree comprising nodes representing possible symbols of the transmitted symbol vector, and searching the candidate lattice points in a sphere having an initial radius set to the bound parameter, the step of determining estimated symbols comprising searching each component of a candidate lattice point in a search interval comprising a lower bound and an upper bound depending on the initial radius.

The candidate lattice points may then be determined according to a spherical decoding algorithm, and the step of determining estimated symbols comprises, in response to the determination of a candidate lattice point, further determining if the Euclidean distance between the candidate lattice point and the point representing the received signal vector is lower than the bound parameter and if so updating the initial radius of the sphere.

According to such embodiment, the step of updating the initial radius may comprise computing an updated radius from the Euclidean distance between the candidate lattice point and the point representing the received signal vector.

In an alternative embodiment, the candidate lattice points may be determined according to a SB-stack spherical decoding algorithm, the step of searching candidate lattice points comprising storing each component of a candidate lattice point in a stack in association with a metric.

There is further provided a computer program product for decoding a signal received through a transmission channel in a communication system, the received signal being represented by a signal vector, the computer program product comprising:
  a non-transitory computer readable storage medium; and
  instructions stored on the non-transitory computer readable storage medium that, when executed by a processor, cause the processor to:
  calculate an initial estimate of a transmitted symbol vector carried by the received signal vector;
  calculate a bound parameter from a linear function of the initial estimate of the transmitted symbol vector, the linear function being defined by a slope coefficient and an intercept coefficient,
  the processor being further caused to:
  determine estimated symbols representative of the transmitted symbols carried by the received signal, the estimated symbols being determined from a set of candidate lattice points, each lattice point comprising a set of components, each component of a candidate lattice point being searched in a search interval, the search interval having at least one search interval bound computed from the bound parameter; and
  determine the estimated symbols from the closest lattice point to the received signal vector among the candidate lattice points.

The invention further provides a device for decoding a signal received through a transmission channel in a communication system, the received signal being represented by a signal vector, and the device comprising:
  at least one processor; and
  a memory coupled to the at least one processor and including instructions that, when executed by the at least one processor, cause the device to:
  calculate an initial estimate of a transmitted symbol vector carried by the received signal vector;
  calculate a bound parameter from a linear function of the initial estimate of the transmitted symbol vector, the linear function being defined by a slope coefficient and an intercept coefficient,
  the device being further caused to:
  determine estimated symbols representative of the transmitted symbols carried by the received signal, the estimated symbols being determined from a set of candidate lattice points, each lattice point comprising a set of components, each component of a candidate lattice point being searched in a search interval, the search interval having at least one search interval bound computed from the bound parameter; and
  determine the estimated symbols from the closest lattice point to the received signal vector among the candidate lattice points.

Accordingly, the described embodiments of the invention provide a bound parameter which optimizes the search of candidate lattice points in tree-search based decoders implementable in any linear communication system presenting a lattice representation of the channel output such as MIMO channels. Particularly, when applied to spherical lattice decoders such as the Sphere Decoder and the SB-Stack decoder, the bound parameter improves the selection of the initial value of the sphere radius used to limit the search of candidate lattice point within a sphere.

BRIEF DESCRIPTION OF THE DRAWINGS

The accompanying drawings, which are incorporated in this specification and constitute a part of thereof, illustrate various embodiments of the invention and, together with the general description of the invention given above, and the detailed description of the embodiments given below, serve to explain the embodiments of the invention.

DETAILED DESCRIPTION

Figure 1:
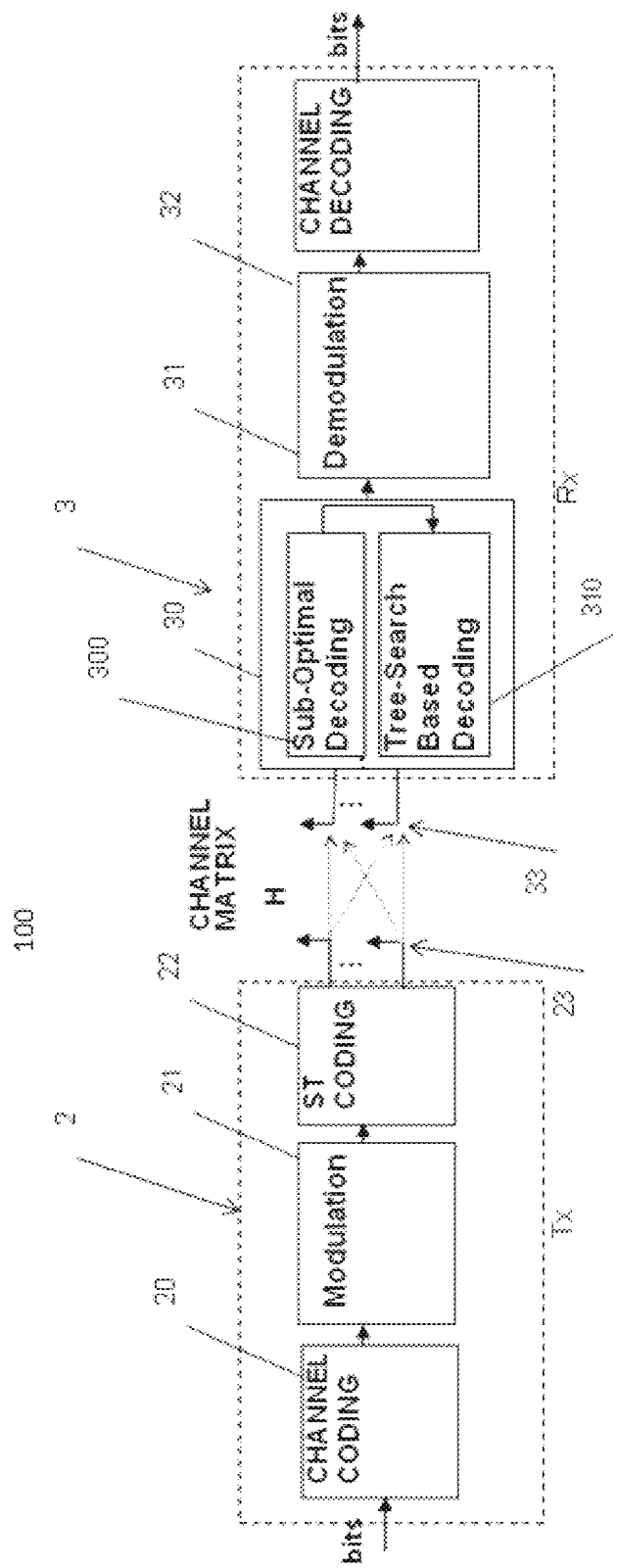
FIG. 1 schematically represents an exemplary communication system implementing the decoding method.

Embodiments of the invention provide a method and apparatus for decoding a signal received over a communication channel that reduces the number of search operations in any tree-search based decoder by providing a bound parameter to constraint the search of the closest lattice point. Such tree search comprises the determination of estimated symbols representative of the transmitted symbols carried by the received signal, the estimated symbols being determined from a set of candidate lattice points. Each candidate lattice point comprises a set of components. Each component of a candidate lattice point is searched in a search interval, the search interval $I_i$ having at least one search interval bound computed from a bound parameter.

According to one aspect of the invention, the bound parameter is determined from a linear function of the Euclidean distance between an initial estimate $d_e$ of the transmitted symbol vector and the received signal. The linear function f( ) (also referred to hereinafter as the "bound parameter function" or the "radius function") is defined by a slope coefficient and an intercept coefficient as follows:

$$f(d_E)=a_1 \cdot d_E + a_2 \qquad (1)$$

In equation (1), $a_1$ represents the slope coefficient of the bound parameter function and $a_2$ represents the intercept coefficient of the bound parameter function. Such bound parameter function ensures that at least one lattice point is found in the search space while optimizing the computational complexity.

The slope and intercept coefficients are real value parameters. Preferably, if the slope coefficient of the radius function $a_1$ is equal to 1 ($a_1=1$), the intercept coefficient $a_2$ is set to a value different from 0 ($a_2 \neq 0$).

The invention may apply to any tree-search based decoder implementing a tree search strategy to scan the lattice points. Particularly, the invention may apply to sphere-constrained decoders which implement a depth-first strategy for searching the candidate lattice points and search the candidate lattice points inside a sphere having a radius initially set to an initial radius value, the sphere being centered at a point representing the received symbol or on a particular symbol of the lattice points. In such application of the invention to sphere-constrained decoders, the bound parameter corresponds to the initial sphere radius of the sphere inside which the candidate lattice points are searched. Examples of sphere-constrained decoders comprise the sphere decoding algorithms or SB-stack decoding algorithm.

Alternatively, the invention may apply to other types of tree-search based decoder algorithms which implement a tree search strategy to scan the lattice points without limiting as such the search region of the lattice points to a spherical region, such as Stack decoding algorithms, the Zigzag Stack decoding algorithm and the M-algorithm. In such applications, the bound parameter may be used to set a metric threshold (or cost threshold), the lattice points being explored only if their respective metric satisfies a constraint related to the bound parameter.

Tree-search based decoding algorithms use a tree representation to search for candidate lattice points. The search tree is a decoding tree data structure representing constellation points of the received signal corresponding to a constellation such as a $2^q$ QAM. The search tree comprises a number of nodes. Each node comprises an integer value representing a component of a symbol of the received data signal (the received data signal may be represented according to a real-value representation). In the following description, the term "node" or "node value" will be similarly used to designate a component of a symbol of the received data signal. The first node of the tree is referred to as the root node. A node that does not have any child node is referred to as a "leaf" node and corresponds to the lowest level in the tree. Each node has at most one parent node located above it in the tree. The root node being the highest node in the tree, it does not have any parent node. The depth (or dimension) of a given node designates the length of the path from this given node up to the root node of the decoding tree. All the nodes of the decoding tree can be reached from the root node. Each path from the root node to a leaf node thus represents a possible transmitted signal. Nodes in the decoding tree represent the different possible values of the symbols $s_i$, where $s_i$, with i representing an integer ranging from n to 1, represent the real and imaginary components of the transmitted information vector.

In one embodiment, the initial estimate of the transmitted symbol vector may be a Zero Forcing decision feedback equalizer decoding (ZF-DFE) estimate, determined using a ZF-DFE detection, the bound parameter function being then defined from the linear function f( ) of the Euclidean distance $d_{DFE}$ between the ZF-DFE estimate and the received signal:

$$f(d_{DFE})=a_1 \cdot d_{DFE} + a_2$$

Although the use of a ZF-DFE estimate has particular advantages in certain applications, the invention is not limited to such type of initial estimate of the transmitted symbol vector. For example, the initial estimate of the transmitted symbol vector may be alternatively determined using any sub-optimal decoding method such as the minimum mean square error (MMSE) method providing an MMSE estimate or a zero forcing (ZF) method providing a ZF estimate. Such initial estimate of the transmitted symbol vector may be obtained using a preprocessing such as a Lattice Reduction or a MMSE-GDFE (Minimum Mean-squared Error Generalized Decision-Feedback Equalization) preprocessing followed by a suboptimal linear or non-linear decoder (such as ZF or ZF-DFE decoders respectively). The following description of certain embodiments of the invention will be made with reference to a ZF-DFE estimate for illustration purpose only. Exemplary linear decoders 300 that may be used to determine the initial estimate of the received signal are described for example in:

K. R. Kumar, G. Caire, and A. L. Moustakas, "The Diversity-Multiplexing Tradeoff of Linear MIMO Receivers", IEEE Information Theory Workshop ITW'07, pp. 487-492, 2007, or J. Jalden, P. Elia, "DMT optimality of LR-aided linear decoders for a general class of channels, lattice designs, and system models", IEEE Transactions on Information Theory, May 25, 2009.

Embodiments of the invention thus improve the determination of the bound parameter defined to constrain the tree search (initial radius of a sphere-constrained decoder or cost threshold) and reduce the number of visited nodes while ensuring ML performance, and speeding up the decoder.

Embodiments of the present invention will now be described in relation with sphere-constrained decoders where the bound parameter represents the initial sphere radius of the sphere within which the lattice points are searched, for illustration purpose only.

In sphere-constrained decoders (also referred to as spherical lattice decoders) such as the SB-Stack decoder as described in EP2274852 and the sphere decoders as described for example "A Universal Lattice Code Decoder for Fading and Channels" (J. Boutros et E. Viterbo, IEEE Transactions on Information Theory, July 1999), the search space, inside which the lattice points are searched, is confined within a sphere having an initial radius, centered on a point representing the received symbol or on another selected point. While the sphere decoder uses a "Depth First Search" strategy to scan the lattice points, the SB-stack uses the "Best First Search" strategy.

Such sphere-constrained decoders are based on generating a decoding tree from a received signal where each path from a root node to a leaf node represents a possible transmitted signal, according to the associated tree search strategy (Depth-first search for a sphere decoder, Best-First search for an SB-stack decoder). Such a decoding tree may be used in the decoder to determine the closest vector to the received signal according to the Maximum Likelihood (ML) criterion, by searching a set of candidate lattice points within the sphere having the initial radius.

The "Depth-First strategy", as implemented in the Sphere Decoders, starts from the root node and explores the first child node $s_n$, then its nearest child node $s_{n-1}$, and so on until reaching a leaf node $s_1$. Given the first path found, the search proceeds by returning back to the level 2 in the tree and explores the neighbor of the already explored node $s_2$. After finding all the possible paths and computing their relative cumulated weights, the shortest path may be output.

The "Best First strategy" as implemented in the SB-stack decoders corresponds to an optimized version of the Breadth-First strategy. The search strategy is based on exploring only best paths in the tree of possible lattice points based on the respective metrics (also referred to as the costs or weights) assigned to the nodes. Starting from the root node, the algorithm explores all child nodes $s_n$ and stores all or a subset of the child nodes in a stack in association with their respective metrics. The stack is then reordered based on the node metrics. According to a recursive process, the child nodes of the top node in the stack are then generated and the metric of the child nodes are computed, before storing all or a subset of the child nodes in the stack in association with their respective metrics and ordering the stack by metric. The search is recursively repeated for each top node in the stack until finding a leaf node. The optimal path $s^{(1)}=(s_n, s_{n-1}, \ldots, s_1)$ is then returned. By maintaining only the nodes having lower weights, the search complexity is reduced.

In sphere-constrained decoders (sphere decoders or SB-stack decoders for example), during the progressive construction of the decoding tree, the nodes corresponding to points inside the sphere are generated. In other words, for each node generated according to the applied tree search strategy, a node $s_i$ is expanded or selected only if the node value is comprised in a search interval $I_i=[B_{inf,i}, B_{sup,i}]$ having a lower boundary $B_{inf,i}$ and an upper boundary $B_{sup,i}$ which both depend on the initially set radius C. The data signal can be estimated by taking into account the node information, such as the node path(s).

A sphere having an initial radius C, centered on a point representing the received symbol (or on another selected point), is thus considered in sphere-constrained decoders. This amounts to determining if each node value $s_i$ is comprised in the search interval $I_i$, the boundaries $B_{inf_i}$ and $B_{sup_i}$ depending on the initial radius.

In a method according to the invention, the initial radius C is determined from the linear function of Euclidean distance $d_{DFE}$ between an initial estimate of the transmitted symbol vector, such as a ZF-DFE estimate, and the received signal, according to equation 1:

$$f(d_{DFE})=a_1 \cdot d_{DFE}+a_2 \qquad (1)$$

The initial radius is thus optimally set so that the number of lattice points included inside a sphere with the initial radius can be efficiently reduced. Hence, the computational complexity of the sphere-constrained decoder can be significantly reduced.

The present invention may be implemented in a wireless communication system for decoding information symbols (also referred to hereinafter as lattice points). The communication system comprises at least a transmitter for transmitting simultaneously a plurality of information symbols through a communication channel, and at least a receiver for receiving one or more of the symbols transmitted by the transmitter(s) in the form of independent signals. The communication channel may be any linear AWGN (Additive White Gaussian Noise) channel or multipath channel combined with multicarrier modulation techniques such as an OFDM (Orthogonal Frequency-Division Multiplexing), or multiple access techniques such as CDMA (Code division multiple access).

An embodiment of the invention can be integrated in a receiver, for example for the decoding of data transmitted in a MIMO (Multiple Input Multiple Output) channel, according to any MIMO configuration, or for the decoding of signals sent by multiple users.

When applied to MIMO decoding, in the presence of a single user or multiple users, the dimension of the received signal or channel output depends on the dimension of the signal space at the transmitter, on the number ($n_t$) of the Transmit (Tx) antennas and/or on the number ($n_r$) of Receive (Rx) antennas.

Referring to FIG. 1, an exemplary wireless network environment 100 is shown in which embodiments of the invention may be implemented. The wireless network environment 100 may comprise a plurality of base stations (also referred to as "nodes" or "access points" or "cells" depending on the application context of the invention), each base station including a transmitter and a receiver including one or more antennas. Each station may communicate with other stations through a wireless connection. Each transmitter of a station may exchange data with a receiver of another station according to the wireless communication system illustrated in FIG. 1. The wireless network 100 may rely on a centralized architecture (a controller is provided to control the operation of the base stations) or a decentralized architecture (the base stations may communicate directly with one another). User Terminals (such as wireless devices, cellular phones, personal digital assistants, etc.), may communicate with one or more base stations on the forward link or on the reverse links. The user terminals may be fixed or mobile.

The MIMO configuration may be symmetric, in which case it includes a same number ($n_t$) of Transmit antennas as the number ($n_r$) of Receive antennas. Alternatively, the MIMO configuration may be asymmetric, in which case the number ($n_t$) of Transmit antennas is different from the number ($n_r$) of Receive antennas (in particular the number $n_r$, at the receive side, is higher than $n_t$, at the transmit side to avoid a rank deficiency).

FIG. 1 shows an exemplary wireless communication system 100 between a transmitter and a receiver in which a MIMO transmission is used, implementing an STBC (Space Time Block Code) code in transmission to distribute the symbols modulated over various degrees of freedom of the channel.

The transmitter 2 can transmit a signal to a receiver 3 by means of a noisy MIMO channel. The data transmitter 2 can in particular be integrated in the base stations. The transmitter 2 may comprise for example:

a channel coder 20 for providing convolutional codes, a modulator 21 such as a QAM modulator for delivering symbols;

a space/time coder 22 for delivering a code word;

$n_t$ transmission antennas 23, each transmission antenna being associated with an OFDM modulator.

The transmitter 2 codes a binary signal received as input using a convolutional code provided by the channel coder 20. The signal is then modulated by the modulator 21 according to a modulation scheme (for example, a quadrature amplitude modulation $2^q$ QAM). The modulator 21 can also implement a modulation scheme by phase shift, for example of the nPSK type, or any modulation. The modulation results in the generation of complex symbols belonging to a group of symbols $s_j$. The modulated symbols thus obtained are then coded by the space-time coder 22 to form a code word STBC, such as the Golden Code ("The Golden Code: A 2×2 Full-Rate Space-Time Code with Non-Vanishing Determinants", J.-C. Belfiore, G. Rekaya, E. Viterbo, IEEE Transactions on Information Theory, vol. 51, no. 4, pages 1432-1436, April 2005). The STBC code may be based on a complex matrix of dimension $n_t \times T$, in which $n_t$ designates the number of transmission antennas and T is the time length of the STBC code, or on a spatial multiplexing (the modulated symbols are directly sent to the transmission antennas).

The code word thus generated is converted from the time domain to the frequency domain and distributed over the $n_t$ transmission antennas. Each dedicated signal is then modulated by a respective OFDM modulator, and transmitted over the corresponding transmission antenna 23, optionally after filtering, frequency transposition and amplification.

The receiver 3 can be also integrated in the base stations. The receiver 3 may be configured to receive a signal y transmitted by the transmitter 2 in a wireless channel. The channel may be noisy (for example channel with Additive White Gaussian Noise (AWGN) subjected to fading). The signal transmitted by the transmitter 2 may be further affected by echoes due to the multiple paths and/or the Doppler effect.

In one exemplary embodiment, the receiver 3 may comprise:

$n_r$ receiving antennas 33 for receiving the signal y, each receiving antenna being associated with a respective OFDM demodulator; the OFDM demodulators ($n_r$ demodulators) are configured to demodulate the received signal observed at each receiving antenna and delivering demodulated signals. A frequency/time converter may be used to perform a reverse operation of the time/frequency conversion implemented in transmission, and to deliver a signal in the frequency domain;

a space/time decoder 30 configured to deliver a decoded signal;

a demodulator 31 configured to perform a demodulation associated with a decoding.

The Space Time decoder 30 may comprise an initial estimation unit such as a sub-optimal decoder 300 (which may be a linear or non-linear decoder) for providing an initial estimation of the transmitted signal (also referred to as a "sub-optimal signal estimation") from the received signal using a sub-optimal decoding technique such as a ZF-DFE technique. The Space Time decoder 30 further comprises a tree-search based decoder 310 according to the embodiments of the invention which is configured to use the initial estimate of the original signal (e.g. ZF-DFE estimate), provided by the signal initial estimation unit, to decode the received signal.

It should be noted that the receiver 3 implements a reverse processing of the processing implemented in transmission. Accordingly, if a single-carrier modulation is implemented in transmission instead of a multi-carrier modulation, the $n_r$ OFDM demodulators are replaced by corresponding single-carrier demodulators.

The skilled person will readily understand that the various embodiments of the invention are not limited to specific applications. Exemplary applications of this new decoder include, with no limitation, multi-user communication systems, MIMO decoding in any symmetric or asymmetric configurations and implementable in wireless standards such as the WiFi (IEEE 802.11n), the cellular WiMax (IEEE 802.16e), the cooperative WiMax (IEEE 802.16j), the Long Term Evolution (LTE), the LTE-advanced, the 5G ongoing standardization, and optical communications.

In one application of the invention to a multi-antenna system, for decoding a signal received by the multi-antenna system (MIMO), with $n_t$ transmit and $n_r$ receive antennas using spatial multiplexing, the data signal $y_c$ received as a complex-valued vector is equal to:

$$y_c = H_c s_c + w_c \tag{2}$$

In Equation (2), $H_c$, $s_c$ and $w_c$ correspond respectively to the complex value of the channel matrix H, the vector s representing the transmitted data signal and the noise vector w. The received signal $y_c$ may be then transformed into a real-value representation, for example according to equation (3):

$$y = \begin{bmatrix} \mathcal{R}(H_c) & -\mathcal{I}(H_c) \\ \mathcal{I}(H_c) & \mathcal{R}(H_c) \end{bmatrix} \begin{bmatrix} \mathcal{R}(s_c) \\ \mathcal{I}(s_c) \end{bmatrix} + \begin{bmatrix} \mathcal{R}(w_c) \\ \mathcal{I}(w_c) \end{bmatrix} \tag{3}$$

In equation (3), $\mathcal{R}(\bullet)$ and $\mathcal{I}(\bullet)$ denote respectively the real and imaginary parts of a complex-value vector.

The equivalent channel output can then be written as:

$$y = Hs + w \tag{4}$$

In embodiments where a length-T Space-Time code is used, the channel output can be written in the same form as equation (2) with the equivalent channel matrix $H_{eq}$ given by:

$$H_{eq} = H_c \Phi \tag{5}$$

In equation (5), $\Phi \in \mathbb{C}^{n_t T \times n_t T}$ corresponds to the coding matrix of the underlying code. Both uncoded and coded schemes result in a same real-value lattice representation. The following description will be accordingly made with reference to the spatial multiplexing and symmetric case with $n_t = n_r$ and $n = 2n_t$ for illustration purpose only.

According to the equivalent system obtained in (4), the received signal can be viewed as a point of the lattice generated by H and perturbed by the noise vector w.

The receiver is configured to provide an estimate $\hat{s}$ of the symbol vector s, from the given data in H and y. Under such conditions, optimal ML decoding is solved for the closest vector in the n-dimensional lattice generated by H according to the minimization problem:

$$\hat{s} = \arg\min_{s_c \in QAM} \|y - Hs\|^2 \tag{6}$$

It should be noted that the embodiments of the invention particularly apply to coherent systems where H is known at the receiver or estimated at the receiver before the decoding stage.

The ML decoder accordingly chooses the symbol vector s which yields the smallest Euclidean distance between the received vector y and the hypothesized message Hs. The ML decoder represents a discrete optimization problem over candidate vectors s within the chosen constellation. In the case of higher constellations and higher dimension of the system (number of antennas), the search for the ML solution in an exhaustive way generally requires a very high complexity.

Before transmission of the signal to the decoder, a pre-decoding may be performed using a QR decomposition of the channel matrix such that H=QR where Q designates an orthogonal matrix and R is an upper triangular matrix. Given the orthogonality of Q, equation (4) can be rewritten in the following form:

$$\tilde{y}=Q'y=Rs+Q'\tilde{w} \quad (7),$$

Where $\tilde{w}$ is the equivalent noise having the same properties as w.

The ML decoding problem then amounts to solving the equivalent system given by:

$$\hat{s}=\arg\min_{s\in A}\|\tilde{y}-Rs\|^2 \quad (8),$$

where $\mathcal{A}$ designates the constellation.

As a sphere constrained decoder satisfies a spherical region constraint for the search of the closest point, the optimal solution s belongs to the sphere $\mathcal{S}$ of radius C and satisfies:

$$\hat{s}=\arg\min_{s\in A}\|\tilde{y}-Rs\|^2\le C^2 \quad (9).$$

The problem expressed by equation 9 may be solved by considering the parameter $\rho=R^{-1}\tilde{y}=H^{-1}y$ and $\xi=\rho-s$, where $\rho$ represents the coordinates of $\tilde{y}$ in the lattice $\Lambda_R$. Accordingly:

$$R\xi=R(\rho-s)=\tilde{y}-Rs$$

A sphere constrained decoder searches the closest lattice point to the received point within a sphere centered at a point representing the received symbol or alternatively at another selected point. Each vector (codeword) Hs is represented by a lattice point in a lattice representation. The sphere-constrained decoder outputs any lattice point inside the sphere and as a result the nearest lattice point to the received signal (ML solution) is found by enumerating the lattice points inside the sphere that belong to the used constellation.

The following description of certain applications of the invention to sphere-constrained decoders will be made with reference to a sphere centered on a point representing the received symbol y for illustrative purpose, although it is to be understood that the invention also applies to a sphere centered on another selected point.

Sphere constrained decoders determine a set of lattice points inside the sphere $\mathcal{S}(y, C)$ centered at the point y representing the received symbol y and having a radius C by converting H into a triangular matrix through the QR decomposition. The sphere constraint according to which a lattice point is to belong to the sphere S (Hs∈$\mathcal{S}$(y, C)) can be expressed according to the inequality (10):

$$\|\tilde{y}-Rs\|^2\le C^2 \quad (10)$$

From the previous formulas, the inequality $\|\tilde{y}-Rs\|^2\le C^2$ can be rewritten as:

$$\|R\xi\|^2\le C^2 \quad (11)$$

In Equation (11), R is a n×n matrix and $\xi$ is an n-dimensional vector.

The minimization problem (ML solution) $\min_{s\in A}\|\tilde{y}-Rs\|^2\le C^2$ can thus be rewritten:

$$\min_{s\in A}\|R\xi\|^2\le C^2 \quad (12)$$

To limit the search region to the sphere of initial radius C, the search interval $I_i=[b_{inf,i}; b_{sup,i}]$ is defined for each decoded component $s_i$, the lower boundary $b_{inf,i}$ and the upper boundary $b_{sup,i}$ of the search interval $I_i$ being determined from the initial radius C.

Indeed, the solution to the sphere constraint can be found recursively by scanning the points s in the sphere of radius C according to a branch and bound approach and by selecting the candidate lattice points that satisfy equation (12). To recursively solve equation 12, starting from the bottom layer of matrices involved in the inequality (12), for each real or imaginary component of a symbol of the signal to be decoded, the interval $I_i=[b_{inf,i}; b_{sup,i}]$ is used. Specifically, the search interval $I_i$ for each decoded symbol $s_i$ such that $b_{inf,i}\le s_i\le b_{sup,i}$ may be defined by the following boundaries:

$$b_{inf,i}=\left\lceil -\sqrt{\frac{T_i}{p_{ii}}}+S_i \right\rceil \quad (13.1)$$

$$b_{sup,i}=\left\lfloor \sqrt{\frac{T_i}{p_{ii}}}+S_i \right\rfloor \quad (13.2)$$

Where:

$$p_{ii}=R_{ii}^2 \text{ with } i=1,\ldots,n \quad (13.3)$$

$$p_{ij}=\frac{R_{ij}}{R_{ii}} \text{ with } j=i+1,\ldots,n \quad (13.4)$$

$$S_i=\rho_i+\sum_{j=i+1}^{n}p_{ij}\xi_j \quad (13.5)$$

$$T_i=C^2-\sum_{l=i+1}^{n}p_{ll}\left(\xi_l+\sum_{j=l+1}^{n}p_{lj}\xi_j\right)^2=T_{i-1}-p_{ii}(S_i-s_i) \quad (13.6)$$

The number of visited nodes during the decoding process depends then on the interval $I_i$ for each symbol $s_i$, the boundaries of the search interval depending on the initial sphere radius C.

It should be noted that for a given channel matrix H, the computational decoding complexity of the sphere decoder is given by:

$$O\left(n^2\times\left(1+\frac{n-1}{4dC^2}\right)^{4dC^2}\right) \quad (14)$$

In formula 14, $d^{-1}$ denotes a lower bound for the eigenvalues of the Gram matrix $G=H'H$ and C corresponds to the initial sphere radius. This shows that the initial radius greatly impacts the decoding complexity of sphere-constrained decoders.

By setting the initial sphere radius of the sphere C from the linear function (1), which takes as parameter the Euclidean distance between the initial ZF-DFE estimate (or more generally any estimate of the transmitted signal vector. The ZF-DFE solution constituting a suboptimal estimate of the original signal) and the received signal, the search of candidate lattice points is optimized.

Figure 2:
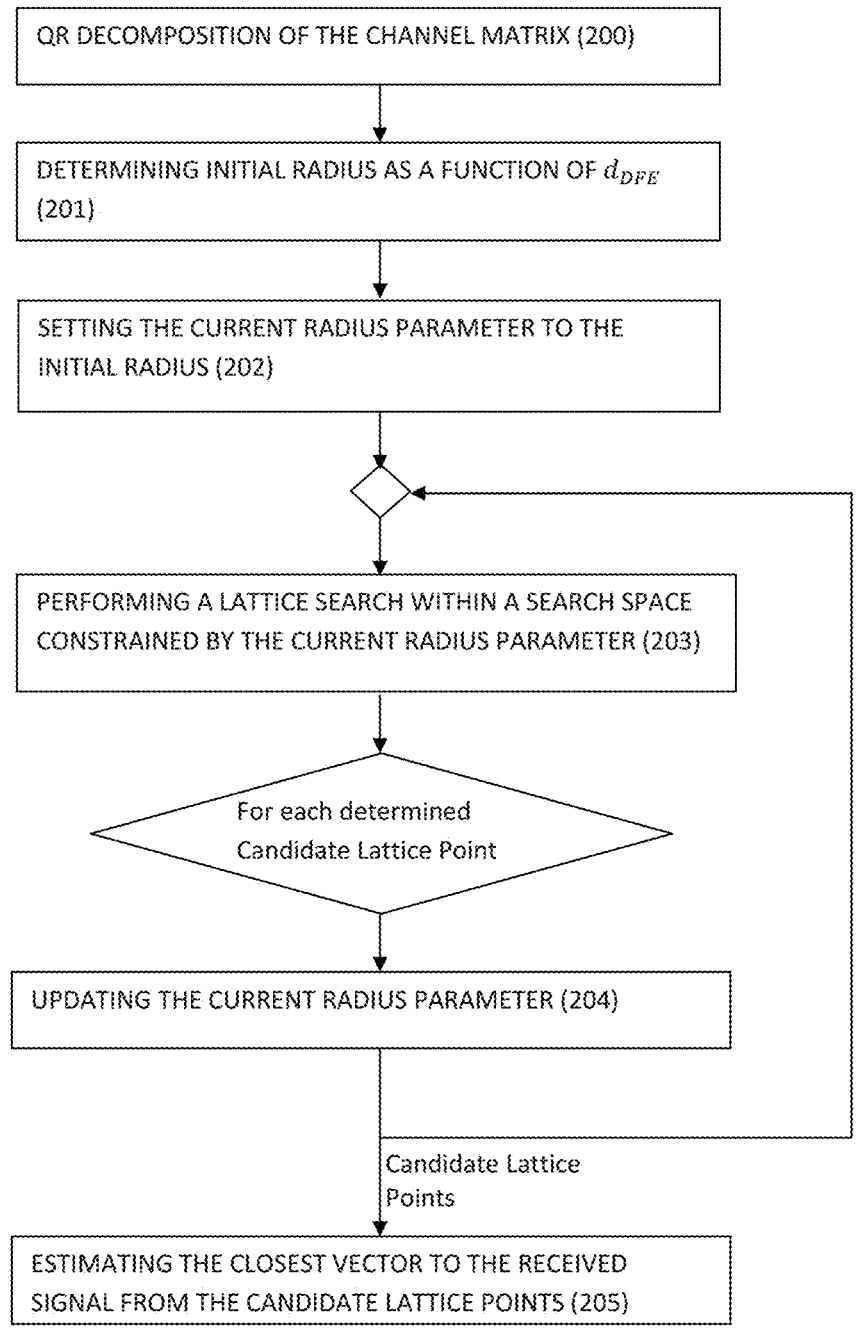
FIG. 2 is a flowchart depicting the main steps of the sphere-constrained decoding method according to certain embodiments of the invention.

Referring now to FIG. 2, a flowchart is presented that depicts a process which may be executed by a sphere decoder, according to certain embodiments.

Prior to the decoding method, in a predecoding step (200), a QR-decomposition of the channel matrix H, as described above, may be performed to provide the Q and R matrices.

In step 201, an initial radius is determined from the linear radius function $f( )$ of the Euclidean distance $d_{DFE}$ from the received signal y to the ZF-DFE estimate $Hs_{DFE}$.

Let $d_{DFE}$ denote the Euclidean distance from the received signal to the ZF-DFE estimate $s_{DFE}$ such that:

$$d_{DFE} = \|y - Hs_{DFE}\| \quad (15)$$

The initial radius $C_{prop}$ may then be determined from the parameter $C_{d_{DFE}}$:

$$C_{d_{DFE}} = f(d_{DFE}) \quad (16)$$

In step 203, the sphere-constrained decoder performs a lattice search to search for candidate lattice points (code words) within a sphere having an initial radius corresponding to the bound parameter determined in step 202, based on a tree search depending on a tree search strategy in order to determine the closest lattice point to the received signal y.

In step 204, each time a candidate lattice point is found, the initial radius may be updated. Step 203 is then iterated for the new radius value set at step 204.

In step 205, the closest vector to the received signal according to the Maximum Likelihood (ML) criterion (ML estimate vector) is determined from the candidate lattice points obtained in step 203.

In one embodiment, the tree search strategy may be based on a depth-first tree search (sphere decoding): the search is performed from the highest dimension of the decoding tree in a descending order to search for lattice points included inside the sphere centered at the received signal and having the initial radius while branches out of the sphere are deleted (i.e. satisfying inequality (10)). This involves that only the nodes having a value that is comprised in the interval $I_i = [b_{inf,i}; b_{sup,i}]$ are selected, with $b_{inf,i}$ and $b_{sup,i}$ depending on the initial radius, calculated in step 201. The interval $I_i$ is determined for each symbol component (represented by a node value).

Each time a candidate lattice point is found inside the sphere, the radius of the sphere may be updated in step 204 by setting the initial radius to a new value equal to the Euclidean distance between the found lattice point and the received signal in order to reduce the search space of the sphere, if such Euclidean distance is inferior to the radius. When all the lattice points have been searched recursively, the candidate lattice point having the minimum Euclidean distance to the received signal from the candidate lattice points may be selected as the ML estimate vector in step 205.

Alternatively, the tree search strategy may be based on a Best-first strategy as implemented by the SB-stack decoder. The SB-stack decoder uses a tree representation of the ML decoding problem, each path from the root node to a leaf node being a possible transmitted signal: Starting from the root node (from the highest dimension of the tree in a descending order), all or a subset of the child nodes $s_n$ are explored, and for each explored node a metric associated with the node is computed. Only the nodes having a value that satisfies the sphere constraint (according to inequality (10)) are generated and may be stored in a stack. This involves that only the nodes having a value that is comprised in the interval $I_i = [b_{inf,i}; b_{sup,i}]$ are visited, where $b_{inf,i}$ and $b_{sup,i}$ depend on the initial radius, as calculated in step 201, can be stored in the stack. An interval is determined for each node representing a component of a symbol of the signal to be decoded. The search is continued until finding a leaf node and the optimal path $s^{(1)} = (s_n, s_{n-1}, \ldots, s_1)$ is returned in step 205 (closest vector to the received signal vector according to ML criterion), without any update of the radius. Particularly, in step 205, a likelihood probability may be further assigned to the bits of at least one symbol of the data signal, taking into account the stored paths and a probabilistic estimation of the data signal (single-carrier and multi-carrier) may be determined taking into account the path(s) stored in the second stack and likelihood probabilities to determine the optimal path.

Figure 3:
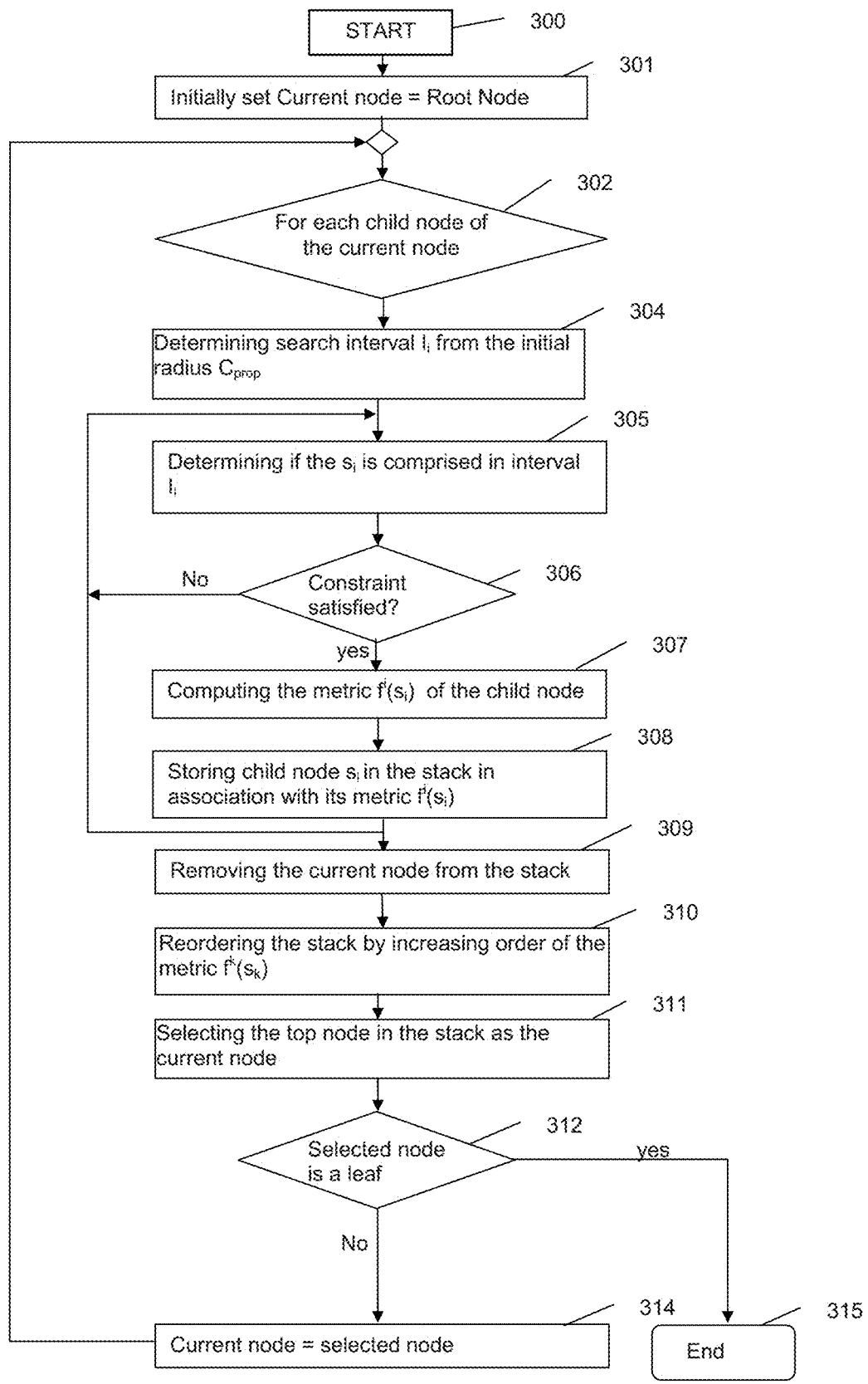
FIG. 3 is a flowchart depicting an exemplary application of the invention to SB-stack decoding.

Referring to FIG. 3, a flowchart depicting the SB stack decoding method according to certain embodiments is shown.

In the SB stack embodiment, the pre-decoding step 200 of FIG. 2 may comprise:

performing a QR decomposition of the channel matrix such that H=QR where Q designates the orthogonal matrix and R designates an upper triangular matrix, calculating the equivalent system according to equation 7, which provides a triangular lattice representation of the lattice generated by H or equivalently by R, Calculating the ZF-DFE point: $\rho = H^{-1} y$ This allows making a tree search to find the point in the tree solution of the minimization problem given by equation (12): $\min_{s \in A} \|R\xi\|^2 \leq C_{prop}^2$ (12), with $\xi = \rho - s$.

Once the signal has been received, the decoder may implement at least one iteration of the following steps 302 to 315, for a current node of the tree stored in the stack.

The generation of the decoding tree implements at least one iteration of the following steps, for a current node of the tree stored in the stack. The first node of the tree is the root node.

The method initially starts with the root node as the current node. The first current node is therefore the root node (step 301).

The method initially starts by processing the root node as the current node (step 301). Steps 302 to 315 are iterated for each current node selected from the top of the stack to generate the child nodes for which the current node is the parent node. Each iteration is thus associated with a level i of the decoding tree (i=n to 1). The parameter i may be decremented for each new iteration, depending on the top node selected in the stack.

The first iteration of the decoding tree method is implemented to determine the child nodes of the root node at a first level i=n, which provides the ZF-DFE solution. The ZF-DFE solution (or more generally the suboptimal estimation of the original signal) may be determined in a preliminary step before the iterations 302 to 315 of the stack decoding method to find the ML solution.

The subsequent iterations of the decoding tree method are implemented to determine the child nodes of a current node corresponding to the top node in the stack (and to a given level or layer i of the decoding tree). Initially the current node is set as the root node.

Each node of the tree may be associated with a metric $f'(s_i)$, a path and/or a dimension (or depth). The dimension of a node corresponds to the number of levels between that node and the root node. The metric of a node may correspond to a function of the Euclidean distance between the signals received and the path between the root node and the node considered. In the decoding tree, there exists a single path between the root node and a node being considered. From this path, it is thus possible to determine the corresponding decoded bits or an estimation of the transmitted information sequence transmitted between the root node and the node considered.

Specifically, for the current node being processed, all or a preselected subset of child nodes are determined by projecting $\tilde{y}$ on the i-th layer of the matrix R resulting from the QR decomposition, and for each child node (step 302), a constraint defining a condition that is to be satisfied by the child node with respect to the search interval $I_i$. The search interval $I_i=[b_{inf,i}; b_{sup,i}]$ for the level i of the current node (corresponding to a component of the decoded symbol) is determined in step 304 and comprises a lower bound $b_{inf,i}$ and an upper bound $b_{sup,i}$ determined from the initial radius according to equations (13.1) and (13.2). This interval thus limits the search region.

Specifically, in steps 305 and 306, it is determined if the considered child node of the current node has a value comprised within the interval $I_i$. If so, the metric of the node is computed in step 307 and the child node is added in the stack, in step 308, together with its associated metrics. Additional data may be stored in the stack in association with each child node such as the path and/or the dimension of the child node. A child node may be thus taken into consideration only when its value lies in the search interval $I_i$. Accordingly, all child nodes or a subset of the child nodes having a value comprised in the interval $I_i$ will be stored in the stack. As a result, the paths scanned in the tree correspond to the points of the lattice located inside a sphere having a radius $C_{prop}$.

In certain embodiments, the metric $f'(s_i)$ associated with a child node ($s_i$) may be computed in step 307 as the weight metrics ($w(s_j)$) of the nodes in the tree comprised in the path from the root node $s_n$ to the current node $s_i$.

In particular, the metric associated with a reference child node ($s_i$) at level i ($i^{th}$ decoded symbol) may be determined as the cumulated weight $cw(s_i)$. The cumulated weight $cw(s_i)$ is determined from the sum of the weight metrics $w(s_j)$ of the nodes in the tree comprised in the path $s^{(i)}$ from the root node $s_n$ to the node $s_i$ (due to the triangular structure of matrix R, the search starts from the component $s_n$, where n designates the dimension of the channel matrix).

As the cumulated weight $cw(s_i)$ of a node $s_i$ is equal to the sum over all weights for different nodes forming the path $s^{(i)}$, it represents the metric of the path. A path of depth i in the tree designates the vector of length n−i+1 defined by $s^{(i)}=(s_n, s_{n-1}, \ldots, s_i)$. A node being in depth n is a leaf node.

The weight metric $w(s_j)$ of a node at a level j of the tree can be determined as the Euclidean distance between the $j^{th}$ component of the vector $\tilde{y}$ representing the received signal and the vector $(s_n \ldots s_j)$ comprising the node values of the tree from the root node $s_n$ to the node $s_j$ at level j according to equation (17):

$$w(s_j)=|\tilde{y}_j-\Sigma_{k=j}^n R_{jk}s_k|^2 \tag{17}$$

Accordingly, the cumulated weight $cw(s_i)$ for a node $s_i$ may be determined as:

$$cw(s_i)=\Sigma_{j=i}^n w_j(s_j)=\Sigma_{j=i}^n|\tilde{y}_j-\Sigma_{k=j}^n R_{jk}s_k|^2 \tag{18}$$

For a leaf node, the cumulated weight $cw(s_1)$ corresponds to the Euclidean distance between the received signal $\tilde{y}$ and $s^{(1)}$, which is equal to $\|\tilde{y}-R_s^{(1)}\|^2|\tilde{y}-R_s^{(1)}|^2$.

In such an embodiment, the ML metric minimization of (8) amounts to a search of the path in the tree having the least cumulated weight.

In an alternative embodiment, the cumulated weight function $cw(s_i)$ may be determined by taking into account a bias parameter b, where b has a real and positive value ($b \in \mathbb{R}^+$).

Specifically, the bias parameter b may be deduced from the weight function, such that equation 17 is replaced by the following equation (parameterized weight $w(s_j)$ for a node $s_i$ at level i in the tree):

$$w(s_j)=|\tilde{y}_j-\Sigma_{k=i}^n R_{jk}s_k|^2-b \cdot j \tag{19}$$

Accordingly, in this alternative parameterized approach, the cumulated weight $cw(s_i)$ for a node $s_i$ may be determined as:

$$cw(s_i)=\Sigma_{j=i}^n w_j(s_j)=\Sigma_{j=i}^n(|\tilde{y}_j-\Sigma_{k=j}^n R_{jk}s_k|^2)-b*i \tag{20}$$

In particular, the application of a bias b equal to zero (b=0) provides the ML solution.

The value of the bias parameter may be determined arbitrarily or depending on the channel variance $\sigma^2$ as described in "Lattice Sequential Decoder for Coded MIMO Channel: Performance and Complexity Analysis". W. Abediseid and Mohamed Oussama Damen. CoRR abs/1101.0339 (2011):

$$b=\sigma^2 \log\left(\frac{4}{\pi\sigma^2}\right) \tag{21}$$

Such parameterized embodiment of the decoding search tree makes it possible to obtain a wide range of decoding performance (thus complexity) by taking into account the bias parameter b in the weight function.

It should be noted that the invention is not limited to the use of sub-optimal decoders 300 to provide an initial estimation of the transmitted signal from the received signal. For example, in certain embodiments of the invention applying the parameterized version of the SB-Stack algorithm (using a bias b), the ZF-DFE estimate can alternatively be determined by setting the bias parameter to a large value (for example higher than 10) in a first iteration of the SB-stack decoding algorithm (iteration of steps 302 to 315), which provides the ZF-DFE solution, and by iterating subsequently the SB-Stack decoding algorithm with a value of the bias set to zero (b=0) to find the ML solution.

The decoding method may be applicable to decode finite or infinite lattices in $\mathbb{Z}^n$, the value of each node in the tree corresponding to the component of a symbol belonging to a constellation having a predefined range between a minimum threshold $C_{min}$ and a maximum threshold $C_{max}$. In embodiments where finite lattices are decoded (finite constellations), such as with QAM modulation, information symbols $s_i$ are selected from a finite alphabet and their real and imaginary parts, which correspond to the decoded symbols over the tree, belong to the finite interval $I=[C_{min}, C_{max}]$. For example, in embodiments using a q-QAM modulation, the symbols $s_i$ belong to the interval $I_c=[\pm 1, \pm 2, \pm 3, \ldots, \pm\sqrt{q}-1]$ and the nodes in the search tree corresponding to the used constellation symbols belong to the infinite set $I=[0, 1, 2, 3, \ldots, \sqrt{q}-1]$ where $C_{min}=0$ and $C_{max}=\sqrt{q}-1$.

In such embodiments, in order to guarantee that the estimated symbols belong to the considered constellation, in steps 305 and 306, the child nodes of the $i^{th}$ level may be alternatively selected within an interval $I'_i$ corresponding to the intersection between the constellation interval $[C_{min}, C_{max}]$ corresponding to the constellation and the intervals $I_i$:

$$I'_i=[\max(C_{min}, b_{inf,i}),(C_{max}, b_{sup,i})].$$

When all the child nodes of the current node have been processed, in step 309, the current node is deleted from the stack.

In step 310, the stack may be reordered by an increasing order of the metrics $f^*(s_k)$ so that the node $s_q$ in the stack having the lowest metric is stored in the top of the stack.

In step 311, the top node of the stack $s_q$ is selected as the current node in order to generate its child nodes.

In step 312, it is determined if the selected node is a leaf node. If the selected node is a leaf node (i.e. not having no child node), the method is terminated in step 315.

Otherwise, in step 314, the selected node is set as the current node and steps 302 to 315 may be repeated for the newly selected node (which represents the node having the lowest metric in the stack) to generate the child nodes, at a next level j of the decoding tree with j being comprised between n−1 to 1. The next processed level j depends on the top node selected in the stack.

Each iteration of steps 302 to 315 (corresponding to the processing of a current node) thus provides a path between the root node and a new leaf node stored in the stack.

When a leaf is reached in the first iteration, the algorithm generates the ZF-DFE solution ρ and may use it to update the initial radius $C_{prop}$ of the sphere to be considered to find the ML solution according to equation: $\min_{s \in A} \|\tilde{y} - Rs\|^2 \leq C_{prop}^2$, in step 204. The radius selection method according to the embodiments of the invention guarantees that at least one point is found inside the sphere (which corresponds at worst to the ZF-DFE point) from the initial radius value.

In the SB-stack decoding embodiment, the closest vector to the vector representing the received signal may be estimated in step 205 of FIG. 2 by taking into account the node information stored in the stack, and in particular the path(s) stored in the stack when such information is available. For example, if a binary estimation (hard decision) is applied, the construction of the tree implements a single iteration of steps 302 to 315 enabling a single path to be determined corresponding to a hard estimation of the transmitted data signal. Alternatively, if a probabilistic estimation (soft decision) is applied, the decoding method may deliver soft-output information in the form of Log-Likelihood Ratio (LLR) values. In this case, several iterations of steps 302 to 315 may be performed. Each iteration provides a different path from the root node to leaf nodes (representing candidate lattice point). These different paths (representing candidate lattice points) may then be stored in an auxiliary stack together with their paths. A probabilistic estimation of the information signal can be determined based on these paths.

Figure 4:
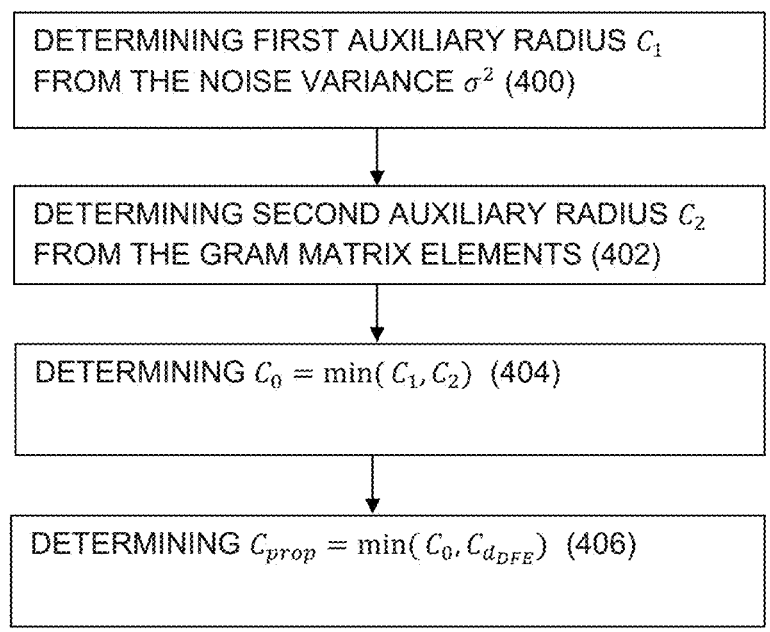
FIG. 4 is a flowchart depicting the determination of the initial radius according to certain embodiments.

Referring to FIG. 4, a flowchart depicting additional details of the initial radius determination step (step 201 of FIG. 2) is shown, according to a first embodiment. In this embodiment, the initial radius of the sphere $C_{prop}$ may be determined as the minimum between:

A first quantity (referred to hereinafter as "intermediate radius") determined from at least one of a first radius $C_1$, which is a function of the noise variance $\sigma^2$, and a second radius $C_2$, which is a function of the minimum of the diagonal elements of the Gram matrix diag($H^tH$) of the channel matrix; and A second quantity $C_{d_{DFE}}$ represented by the linear function f( ) depending on the ZF-DFE estimate.

Specifically, in step 400, a first auxiliary radius $C_1$ depending on the noise variance $\sigma^2$ may be determined:

$$C_1 = 2n\sigma^2 \quad (22)$$

In step 402, a second auxiliary radius $C_2$ depending on the Gram matrix may be determined as:

$$C_2 = \min(\text{diag}(H^tH)) \quad (23)$$

In step 404, a resulting radius may be determined as the minimum between the first auxiliary radius and the second auxiliary radius:

$$C_0 = \min(C_1, C_2) \quad (24)$$

In step 406, the initial radius $C_{prop}$ of the sphere is determined as the minimum between $C_0$ and $C_{d_{DFE}} = f(d_{DFE})$:

$$C_{prop} = \min(C_0, C_{d_{DFE}}) \quad (25)$$

In certain embodiments, the radius function $f( )$ which takes $d_{DFE}$ as parameter may be a linear function of the type $f(d_{DFE}) = a_1 \cdot d_{DFE} + a_2$, where $a_1$ designates the slope coefficient and $a_2$ designates the intercept coefficient. The radius function $f( )$ may be for example a purely multiplicative function with a null intercept coefficient ($a_2=0$) or a purely additive function with a slope coefficient equal to 1 ($a_1=1$).

In particular, at least one of the radius function coefficients $a_1$ and $a_2$ may depend on a predetermined parameter α (referred to hereinafter as "radius function parameter"). It should be noted that the radius function parameter α may be chosen arbitrarily. Alternatively, the parameter α may be selected so that its value satisfies a constraint with respect to a lower threshold $α_{min}$ such as:

$$α \geq α_{min} \quad (26)$$

In certain embodiments, the lower threshold $α_{min}$ may depend on $d_{DFE}$, $C_1$, and/or $C_2$.

In one embodiment, the slope coefficient $a_1$ of the radius function may be equal to $$\frac{1}{\sqrt{α}}.$$

Specifically, it has been demonstrated that the following multiplicative function ($a_2=0$) may improve the total complexity:

$$f(d_{DFE}) = \frac{d_{DFE}}{\sqrt{α}} \quad (27)$$

In equation (27), α (radius function parameter) represents a real-value strictly positive parameter ($α \in \mathbb{R}^+$).

It should be noted that when α is equal to 1 ($α=1$), the radius $C_{d_{DFE}} = f(d_{DFE})$ coincides with the Euclidean distance from the received signal to the ZF-DFE solution.

Figure 5:
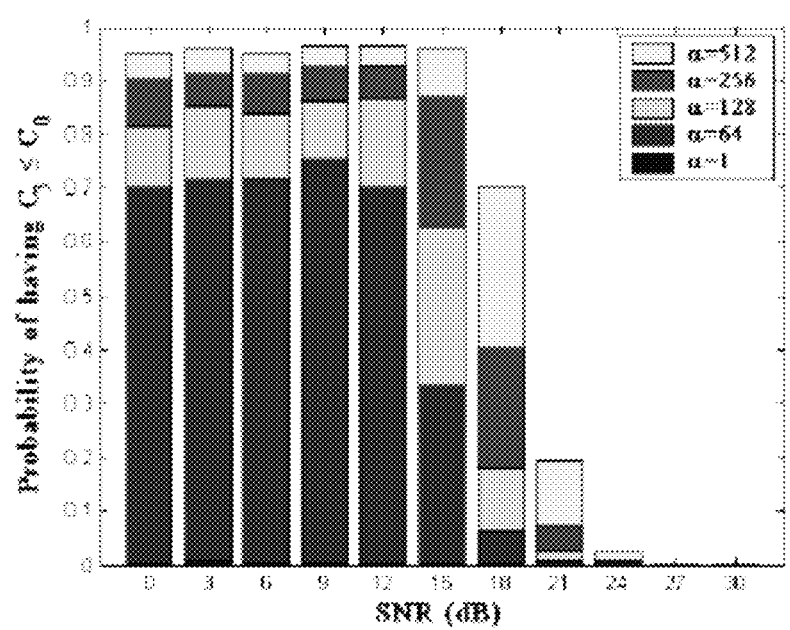
FIG. 5 is a diagram illustrating the probability of having $C_{d_{DFE}} \leq C_0$ in a 2×2 MIMO communication system comprising a Sphere Decoder for different values of the radius function parameter.

FIG. 5 illustrates the probability of having $C_{d_{DFE}} \leq C_0$ in a 2×2 MIMO communication system $n_r = n_t = 2$ comprising a Sphere Decoder using spatial multiplexing and 16-QAM modulations for different values of the parameter α as used in equation (27), and over $10^5$ channel realizations.

FIG. 5 shows that for low and moderate SNR values, the probability that the radius $C_{d_{DFE}}$ be inferior or equal to $C_0$ is larger than 50%. Accordingly, considering $C_{d_{DFE}}$ as the initial radius $C_{prop}$ in such cases rather than $C_0$ is sufficient to find the ML solution. However, it can be seen from FIG. 5 that in high SNR regime, the radius $C_0$ has a smaller value than $C_{d_{DFE}}$ with a very high probability (almost 99%).

In embodiments where the slope coefficient a of the radius function is equal to $$\frac{1}{\sqrt{α}},$$

the lower threshold $\alpha_{min}$ of the radius function parameter $\alpha$ may depends on $d_{DFE}$, $C_1^2$, and/or $C_2^2$. Specifically, the lower bound $\alpha_{min}$ in embodiments where the slope coefficient $a_1$ of the radius function is equal to $$\frac{1}{\sqrt{\alpha}}$$

may be defined as:

$$\alpha_{min} = \max\left(\frac{d_{DFE}^2}{4n^2\sigma^4}, d_{DFE}^2 \times \min^2(\text{diag}(H'H))\right) \quad (28)$$

In another embodiment, the linear radius function $f(\ )$ may comprise an intercept coefficient $a_2$ equal to $-\alpha$.

In particular, the radius function $f(\ )$ used to define $C_{d_{DFE}} = f(d_{DFE})$ may be an additive function (slope coefficient $a_1 = 1$) such as the following additive positive-value function for which the intercept coefficient $a_2 = -\alpha$ $$f(d_{DFE}) = d_{DFE} - \alpha \quad (29)$$

In embodiments where the intercept coefficient $a_2$ is equal to $-\alpha$, the lower threshold $\alpha_{min}$ of the radius function parameter $\alpha$ may depend on $d_{DFE} - C_1$ and/or $d_{DFE} - C_2$. For example, the lower bound $\alpha_{min}$ may be defined as:

$$\alpha_{min} = \max(d_{DFE} - 2n\sigma^2, d_{DFE} - \min(\text{diag}(H'H))) \quad (30)$$

Figure 6:
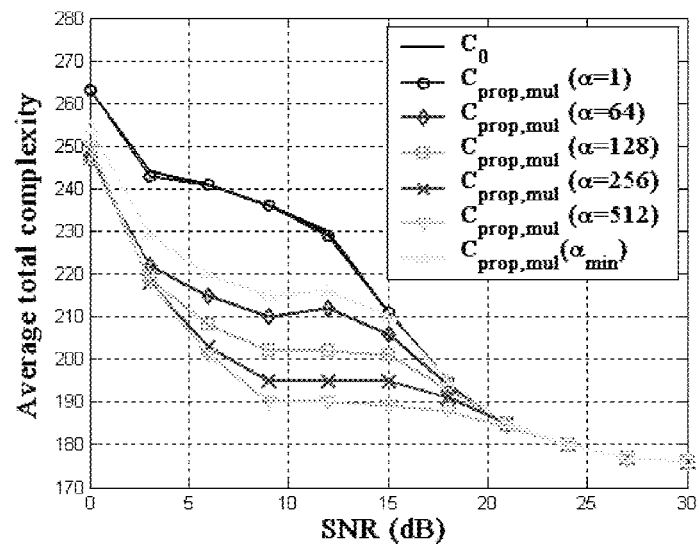
FIG. 6 is a diagram illustrating the total complexity obtained for different values of the radius function parameter $\alpha$ where the radius function is of multiplicative type, in a 2×2 MIMO communication system using spatial multiplexing and 16-QAM modulation, and comprising a sphere decoder.

FIG. 6 illustrates the total complexity in terms of number of multiplications obtained for different values of the parameter $\alpha$ in a 2×2 MIMO communication system ($n_t = n_r = 2$) using spatial multiplexing and 16-QAM modulation, and comprising a sphere decoder where the radius function $f(\ )$ is a multiplicative function according to equation (27) having a linear coefficient $$\frac{1}{\sqrt{\alpha}}$$

FIG. 6 shows that initial radius determined from $C_{d_{DFE}} = f(d_{DFE})$ where $f$ is defined according to equation (27) provides a reduced complexity particularly in the low and moderate SNR range compared to an initial radius equal to $C_0$. It should be noted that larger values of $\alpha$, result in smaller values of $C_0$, thereby allowing a lower complexity while guaranteeing no decoding failure (i.e. using this radius, the algorithm is able to find the ML solution inside the underlying sphere).

Figure 7:
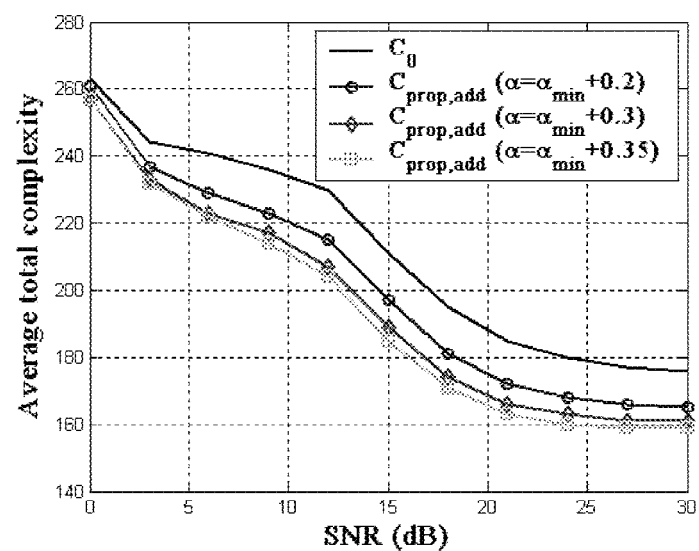
FIG. 7 is a diagram illustrating the total complexity obtained for different values of the radius function parameter $\alpha$ where the radius function is of additive type, in a 2×2 MIMO communication system using spatial multiplexing and 16-QAM modulation, and comprising a sphere decoder.

FIG. 7 illustrates the total complexity in terms of number of multiplications obtained for different values of the parameter $\alpha$ in a 2×2 MIMO communication system ($n_t = n_r = 2$) using spatial multiplexing and 16-QAM modulation, and comprising a sphere decoder where the radius function $f(\ )$ is an additive function according to equation (29). The results obtained are similar to FIG. 6. It should be noted that the initial radius $C_{d_{DFE}}$ allows to find the ML solution while reducing the total decoding complexity compared to the case where the radius $C_0$ is considered.

When applied to the Sphere Decoder, it has been determined that the decoding method provides a complexity gain of at least 12% over a Sphere decoder implementing a conventional radius selection approach.

It should be noted that the examples of FIGS. 6 and 7 are simplified examples provided to illustrate the total complexity which can be obtained with the present invention and are not intended to limit the scope of the invention.

Figure 8:
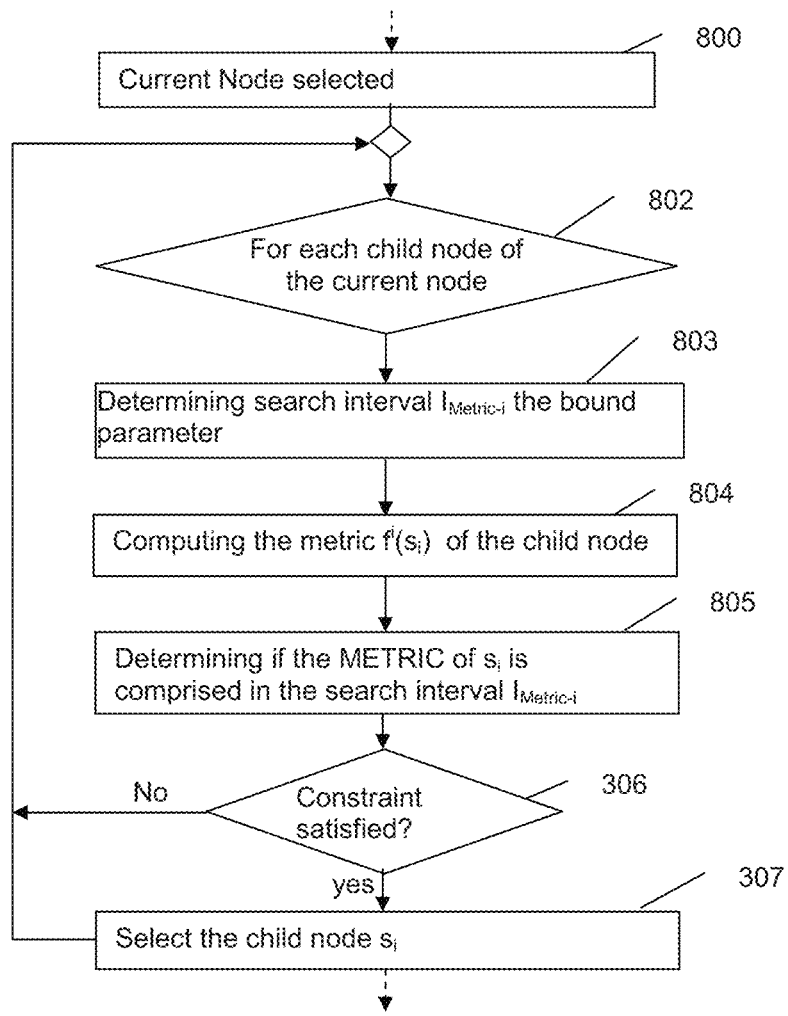
FIG. 8 is a flowchart depicting another embodiment of the invention using the bound parameter as a node metric constraint.

The invention is not limited to sphere-constrained decoders and may apply more generally to other types of tree-search based decoding algorithms, such as sequential decoders. FIG. 8 is a general flowchart depicting the processing of a current node implemented by such tree-search based algorithms, according to certain embodiments of the invention. The previously processed node and the next node of the tree to be processed depend on the specific tree search strategy implemented by the tree-search based algorithm. For the current node being processed (block 800), the child nodes or a subset of the child nodes of the current nodes are generated (step 802). For each child node, a search interval $I_{Metric-i}$ (step 803) and a metric (step 804) are then determined. In step 803, at least one of the lower and the upper bounds of the search interval are determined from the bound parameter which is derived from the linear function (1). In step 804, the metric may be determined as described in relation with block 307 of FIG. 3. In step 806, the child node is selected as a component of a candidate lattice point only if the metric of the child node is comprised in the search interval defined from the bound parameter.

Depending on the decoding algorithm, each node of the decoding tree may generate a limited set of child nodes in step 802. For example, in a zigzag decoding approach as described in patent application EP No. 14306517.5, the decoding algorithm uses a stack similarly to the SB-stack decoder but does not search the candidate lattice points in a sphere. Instead, at each level, the zigzag decoding algorithm generates at most three child nodes comprising a reference child node of the current node determined from the vector representing the received data signal, a first neighbor child node determined by subtracting a positive integer parameter from the value of the reference node, and a second neighbor child node determined by adding the positive integer parameter to the value of the reference child node (step 802). Child nodes are selected in step 806 among the three child nodes. The selected child node can then be stored in a stack similarly to the SB-stack decoder together with their respective metric, the stack being then reordered by increasing order of the node metrics. The top node of the stack, thus obtained, is selected as the new current node to iterate the recursive search operation.

Figure 9:
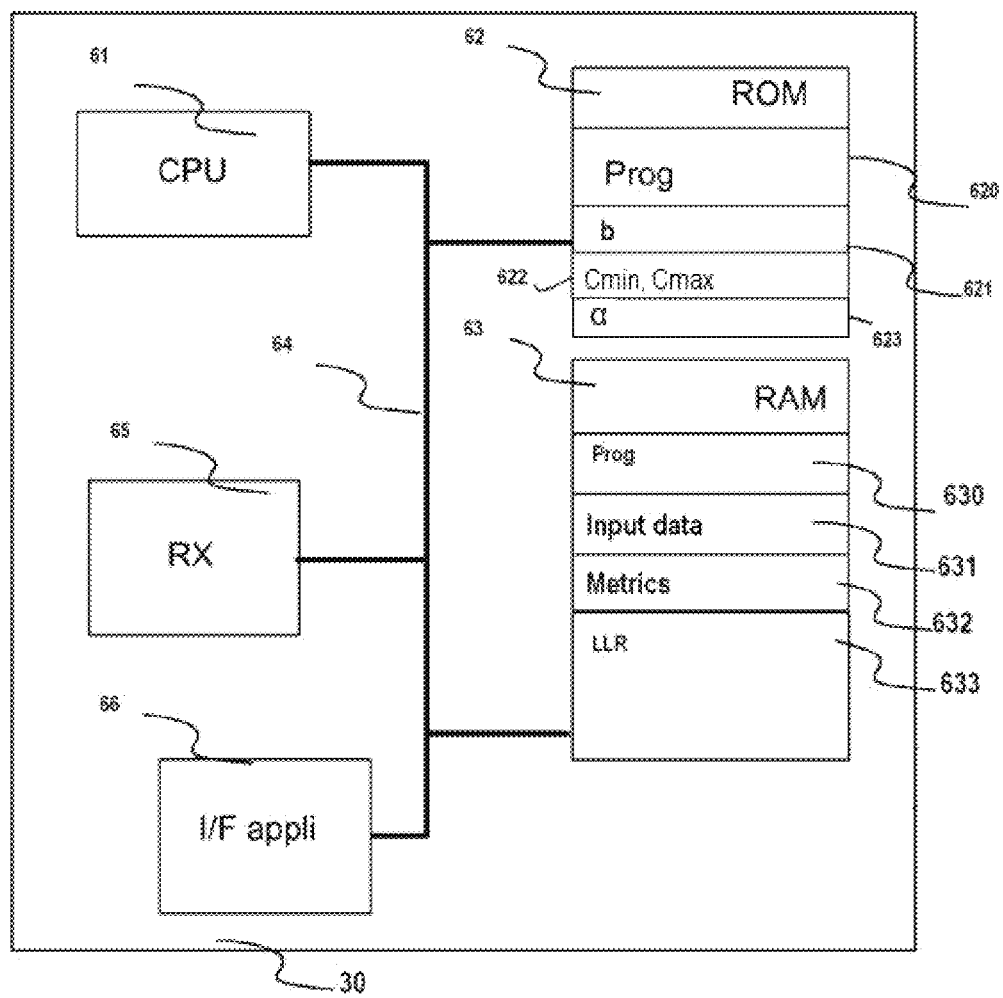
FIG. 9 schematically shows an exemplary hardware architecture of the decoder according to certain embodiments.

FIG. 9 represents an exemplary architecture of a space/time decoder 30 of the receiver 3 in a SB-stack embodiment of the invention. As shown, the space/time decoder 30 may include the following elements, which are linked together by a data and address bus 64:

a microprocessor 61 (or CPU), which is, for example, a digital signal processor (DSP);

a non-volatile memory 62 (or ROM, read-only memory);

a random access memory RAM 63;

an interface 65 for receiving input signals coming from the time/frequency converter;

an interface 66 for transmitting decoded data to the demodulator 31.

The non-volatile ROM memory 62 may include for example:

a register "Prog" 620;

the biais parameter b in parameterized embodiments 621;

the constellation bounds $C_{min}$ and $C_{max}$ 622;

the radius function parameter $\alpha$ 623.

The algorithms for implementing the method according to this embodiment of the invention can be stored in the program 620. The CPU processor 41 may be configured to download the program 620 to the RAM memory and runs the corresponding instructions. Specifically, the CPU comprises instructions for calculating the initial estimate of a transmitted symbol vector carried by the received signal vector, and calculate the bound parameter from the linear function (1) of the initial estimate of the transmitted symbol vector. The CPU further comprises instructions for:

determining estimated symbols representative of the transmitted symbols carried by the received signal, the estimated symbols being determined from the set of candidate lattice points, each component of a candidate lattice point being searched in a search interval having at least one search interval bound computed from the bound parameter; and determining the estimated symbols from the closest lattice point to the received signal vector among the candidate lattice points.

The RAM memory 63 may include:

in a register Prog 630, the program run by the microprocessor 61 and downloaded in an active mode of the space/time decoder 30;

input data in a register 631;

data related to the nodes in a register 632;

likelihood probabilities or LLR in a register 634;

The data stored in the register 632 may include, for a node of the decoding tree, metric parameters associated with this node (path from the root to said node, and/or the depth in the tree).

More generally, the decoding techniques described herein may be implemented by various means. For example, these techniques may be implemented in hardware, software, or a combination thereof. For a hardware implementation, the processing elements of decoder can be implemented for example according to a hardware-only configuration (for example, in one or more FPGA, ASIC or VLSI integrated circuits with the corresponding memory) or according to a configuration using both VLSI and DSP.

While embodiments of the invention have been illustrated by a description of various examples, and while these embodiments have been described in considerable detail, it is not the intent of the applicant to restrict or in any way limit the scope of the appended claims to such detail. Particularly, although the invention has been described mainly in relation with a sphere decoding algorithm or a SB-stack decoding algorithm, and a Zigzag Stack decoding algorithm, the invention also applies to other types of tree-search based decoding algorithms, such as the M-decoding algorithm.

Further, while certain embodiments of the invention have been described in relation to a wireless single-user MIMO system, it should be noted that the invention is not limited to such application. The invention may be integrated in any receiver device operating in any linear communication system characterized by a lattice representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular uplink communications applied in 3G, 4G and LTE standards. Cooperative communications applied for example in ad-hoc networks (wireless sensor networks, machine-to-machine communications, internet of things . . . ) are also examples of distributed MIMO systems. In addition to wireless networks, the present invention may be integrated in optical receiver devices implemented in optical fiber-based communication systems such as Polarization Division Multiplexing-OFDM (PDM-OFDM) systems.

Further, the invention is not limited to communication devices and may be integrated in signal processing devices such as electronic filters of finite impulse response (FIR) used in audio applications like audio crossovers and audio mastering. Accordingly, certain embodiments of the invention may be used to determine an estimate of an input sequence, given an output sequence of a FIR filter of order M.

Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept, such as different definitions of the slope and intercept coefficients $a_1$ and $a_2$ of the radius function $f(\ )$.

Further, the various embodiments of the invention are not limited to particular types of decoding, and apply both to hard and soft decoding.

The invention claimed is:

1. A method for decoding a signal received through a transmission channel in a communication system, said received signal being represented by a signal vector, the method comprising:

calculating an initial estimate of a transmitted symbol vector carried by the received signal vector;

calculating a bound parameter from a value of a linear function of said initial estimate of the transmitted symbol vector and a first quantity depending on a noise variance and a channel matrix associated with said transmission channel, said linear function being defined by a slope coefficient and an intercept coefficient, the slope coefficient and the intercept coefficient depending on a first function parameter ($\alpha$) which is higher than a predefined threshold, said first function parameter being a real value positive parameter, said threshold being determined from said initial estimate of the transmitted symbol vector;

the method further comprising:

determining estimated symbols representative of transmitted symbols carried by the received signal, said estimated symbols being determined from a set of candidate lattice points, each candidate lattice point comprising a set of components, each component of a candidate lattice point being searched in a search interval, said search interval having at least one search interval bound computed from said bound parameter; and determining said estimated symbols from the closest candidate lattice point to the received signal vector among said candidate lattice points.

2. The method of claim 1, wherein said channel matrix is of a given dimension (n), a QR decomposition being previously applied to said channel matrix where Q designates an orthogonal matrix and R an upper triangular matrix.

3. The method of claim 2, wherein said bound parameter ($C_{prop}$) is defined as a minimum value between:

the first quantity being determined from at least one of a first radius ($C_1$) function of the noise variance ($\sigma^2$) and a second radius ($C_2$) function of a minimum of diagonal elements of a Gram matrix of said channel matrix, and a second quantity corresponding to the value of said linear function of said initial estimate ($C_{d_{DFE}}$).

4. The method of claim 3, wherein said first quantity is determined as the minimum between said first radius ($C_1$) and said second radius ($C_2$).

5. The method of claim 3, wherein a minimum value of said threshold depends on a square of the initial estimate of the transmitted symbol vector ($d_{DFE}^2$), a square of the first radius ($C_1^2$), and/or a square of the second radius ($C_2^2$).

6. The method of claim 5, wherein a minimum value of said threshold $\alpha_{min}$ of the first function parameter ($\alpha$) is defined as:

$$\alpha_{min} = \max\left(\frac{d_{DFE}^2}{C_1^2}, d_{DFE}^2 \times C_2^2\right),$$

where $d_{DFE}^2$ designates the square of the initial estimate of the transmitted symbol vector, $C_1^2$ designates the squared first radius ($C_1^2$), and $C_2^2$ the squared second radius.

7. The method of claim 3, wherein the intercept coefficient is equal to $-\alpha$, and a minimum value of said threshold depends on at least one of:
 a difference between the initial estimate of the transmitted symbol vector ($d_{DFE}$) and the first radius ($C_1$) and/or
 a difference between the initial estimate of the transmitted symbol vector ($d_{DFE}$) and the second radius ($C_2$).

8. The method of claim 7, wherein the minimum value of the threshold $\alpha_{min}$ of the first function parameter ($\alpha$) is defined as a maximum value between:
 the difference between the initial estimate of the transmitted symbol vector ($d_{DFE}$) and the first radius ($C_1$) and
 the difference between the initial estimate of the transmitted symbol vector ($d_{DFE}$) and the second radius ($C_2$).

9. The method of claim 1, wherein said linear function is a multiplicative function, said slope coefficient being different from one.

10. The method of claim 1, wherein the slope coefficient is equal to an inverse of a square root of the first function parameter $$\left(\frac{1}{\sqrt{\alpha}}\right).$$

11. The method of claim 1, wherein said linear function is an additive function different from an identity function, the slope coefficient being equal to one and the intercept coefficient being different from zero.

12. The method of claim 1, wherein the intercept coefficient is equal to $-\alpha$.

13. The method of claim 1, wherein said candidate lattice points are determined according to a sphere-constrained decoding algorithm utilizing a decoding tree comprising nodes representing possible symbols of the transmitted symbol vector, and searching said candidate lattice points in a sphere having an initial radius set to the bound parameter, said step of determining estimated symbols comprises searching each component of said candidate lattice point in a search interval comprising a lower bound and an upper bound depending on said initial radius.

14. The method of claim 13, wherein said candidate lattice points are determined according to a spherical decoding algorithm, said step of determining estimated symbols comprising in response to the determination of said candidate lattice point, further determining if an Euclidean distance between said candidate lattice point and a point representing the received signal vector is lower than the bound parameter and if so updating the initial radius of the sphere.

15. The method of claim 14, wherein said step of updating the initial radius comprises computing an updated radius from the Euclidean distance between said candidate lattice point and the point representing the received signal vector.

16. The method of claim 3, wherein said candidate lattice points are determined according to a (Spherical Bound) SB-stack spherical decoding algorithm, said step of searching candidate lattice points comprising storing each component of said candidate lattice point in a stack in association with a metric.

17. A computer program product for decoding a signal received through a transmission channel in a communication system, said received signal being represented by a signal vector, the computer program product comprising:
 a non-transitory computer readable storage medium; and
 instructions stored on the non-transitory computer readable storage medium that, when executed by a processor, cause the processor to:
  calculate an initial estimate of a transmitted symbol vector carried by the received signal vector;
  calculate a bound parameter from a value of a linear function of said initial estimate of the transmitted symbol vector and a first quantity depending on a noise variance and a channel matrix associated with said transmission channel, said linear function being defined by a slope coefficient and an intercept coefficient, the slope coefficient and the intercept coefficient depending on a first function parameter which is higher than a predefined threshold, said first function parameter being a real value positive parameter, said threshold being determined from said initial estimate of the transmitted symbol vector;
 wherein said processor is further caused to:
  determine estimated symbols representative of transmitted symbols carried by the received signal, said estimated symbols being determined from a set of candidate lattice points, each candidate lattice point comprising a set of components, each component of a candidate lattice point being searched in a search interval, said search interval having at least one search interval bound computed from said bound parameter; and
  determine said estimated symbols from the closest candidate lattice point to the received signal vector among said candidate lattice points.

18. A device for decoding a signal received through a transmission channel in a communication system, said received signal being represented by a signal vector, wherein the device comprises:
 at least one processor; and
 a memory coupled to the at least one processor and including instructions that, when executed by the at least one processor, cause the device to:
 calculate an initial estimate of a transmitted symbol vector carried by the received signal vector;
 calculate a bound parameter from a value of a linear function of said initial estimate of the transmitted symbol vector and a first quantity depending on a noise variance and a channel matrix associated with said transmission channel, said linear function being defined by a slope coefficient and an intercept coefficient, the slope coefficient and the intercept coefficient depending on a first function parameter which is higher than a predefined threshold, said first function parameter being a real value positive parameter, said threshold being determined from said initial estimate of the transmitted symbol vector;

wherein said device is further caused to:

determine estimated symbols representative of transmitted symbols carried by the received signal, said estimated symbols being determined from a set of candidate lattice points, each candidate lattice point comprising a set of components, each component of a candidate lattice point being searched in a search interval, said search interval having at least one search interval bound computed from said bound parameter; and determine said estimated symbols from the closest candidate lattice point to the received signal vector among said candidate lattice points.

* * * * *